United States Patent [19]
Allard et al.

[11] Patent Number: 5,476,049
[45] Date of Patent: Dec. 19, 1995

[54] MOTION CONTROL APPARATUS

[76] Inventors: Gene R. Allard, P.O. Box 448, Jefferson, S. Dak. 57038; David D. Allard, R.R. 1, Box 2795, Rapid City, S. Dak. 57702

[21] Appl. No.: 132,052

[22] Filed: Oct. 5, 1993

Related U.S. Application Data

[63] Continuation-in-part of Ser. No. 687,378, Apr. 18, 1991, Pat. No. 5,265,542.

[51] Int. Cl.⁶ .................................................. A47B 11/00
[52] U.S. Cl. ................................ 108/138; 108/146
[58] Field of Search ............................. 108/146, 143, 108/148, 138; 288/410, 316.2, 231.3

[56] References Cited

U.S. PATENT DOCUMENTS

| | | | |
|---|---|---|---|
| 836,303 | 11/1906 | Christenson | 248/410 X |
| 1,235,613 | 8/1917 | Vandergrift | 248/410 |
| 1,372,456 | 3/1921 | Roetter | 248/410 |
| 3,188,986 | 6/1965 | La Vigne | 108/146 X |
| 3,314,384 | 4/1967 | Mann et al. | 108/146 |
| 3,488,026 | 1/1970 | Wallace et al. | 248/410 X |
| 4,054,190 | 10/1977 | Wilkes . | |
| 4,664,549 | 5/1987 | Lundqvist . | |
| 5,265,542 | 11/1993 | Allard et al. | 108/138 |

FOREIGN PATENT DOCUMENTS

426880  4/1935  United Kingdom .................. 248/410

*Primary Examiner*—Jose V. Chen
*Attorney, Agent, or Firm*—Klaas, Law, O'Meara & Malkin; Joseph J. Kelly

[57] ABSTRACT

Motion control apparatus is provided for permitting movement of a slidable member in one direction relative to a fixed support while releasably preventing movement in the opposite direction or for releasably preventing movement of the slidable member in either direction using one or more locking arms pivotally mounted on the slidable member and resiliently urged into the locking position with a release rod slidably mounted on the slidable member to overcome the resilient urging to permit sliding movement of the slidable member. Also, movement preventing apparatus is provided to hold at least one locking arm in a non-locking position.

20 Claims, 5 Drawing Sheets

MOTION CONTROL APPARATUS

This application is a continuation-in-part of U.S. patent application Ser. No. 07/687,378 filed Apr. 18, 1991 for MOTION CONTROL APPARATUS, now U.S. Pat. No. 5,265,542.

FIELD OF THE INVENTION

This invention relates generally to the control of relative sliding motion between two articles and more particularly to apparatus for permitting or preventing relative movement between a relatively fixed support and a slidable member.

BACKGROUND OF THE INVENTION

In many instances, it is desirable to control the relative movement between two articles by permitting or preventing the movement of one article relative to the other. One such instance is described in U.S. Pat. No. 4,949,650 to Allard which is incorporated herein by reference thereto. In this patent, one part of a table top is moved relative to a fixed support and the other part of the table top for various purposes. For some purposes, it is desirable to have apparatus to permit a slidable member to be moved in one direction by simply applying a force thereto but to prevent movement automatically in the opposite direction. For other purposes, it is desirable to prevent movement of the slidable member until desired. In all instances, it is desirable that the movement or non-movement be accomplished as easily and economically as possible.

BRIEF DESCRIPTION OF THE INVENTION

This invention provides motion control apparatus which permits movement of a slidable member relative to a, fixed support by the application of pressure thereto but releasably prevents movement of the slidable member in the opposite direction. The motion control apparatus also releasably prevents movement of a slidable member in opposite directions relative to a fixed support. Additional means are provided for permitting movement of a slidable member in one of the two opposite directions while preventing movement of the slidable member in the opposite one of the two opposite directions.

In one preferred embodiment of the invention the motion control apparatus comprises at least one relatively fixed support and at least one slidable member mounted for sliding movement thereover. Releasable locking means are provided for preventing the sliding movement of the at least one slidable member. Control means are provided for releasing the locking means to permit movement of the at least one slidable member. The releasable locking means comprise at least one rod mounted at a fixed location on the at least one support and having a longitudinal axis. At least one locking arm is pivotally mounted on the at least one slidable member for movement therewith and having at least one opening formed therein with the opening having at least one sidewall. The at least one opening has a transverse cross-sectional area greater than the transverse cross-sectional area of the at least one rod so that the locking arm may slide over the at least one rod. Resilient means are provided for urging at least a portion of the at least one sidewall into contact with at least a portion of the at least one rod to prevent relative movement between the at least one locking arm and the at least one rod. The resilient means are designed to prevent the relative movement only in one direction. The control means comprise at least one release rod. Mounting means are provided for mounting the at least one release rod on the at least one slidable member for movement therewith and for movement relative thereto. Force applying means are provided for applying a force on the at least one locking arm to overcome the resilient means to permit relative movement between the at least one locking arm and the at least one rod. The force applying means comprise a lever arm; a first pivot means for pivotally mounting the lever arm on the at least one slidable member; and a second pivot means for pivotally connecting one end of the lever arm to one end of the at least one release rod so that movement of the lever arm moves the at least one release rod to apply the force on the at least one locking arm. Counterbalancing means are provided for counter-balancing the weight of the at least one slidable member. The force applying means apply either a pushing force or a pulling force on the at least one locking arm. The transverse cross-sectional configurations of the at least one rod and the at least one opening are cylindrical.

In another preferred embodiment of the invention, the releasable locking means include at least a pair of locking arms which are pivotally mounted on the at least one slidable member and each of them has at least one opening formed therein which opening has at least one sidewall. The at least one opening has a transverse cross-sectional configuration greater than the transverse cross-sectional configuration of the at least one rod to permit sliding movement of the at least a pair of locking arms over the at least one rod. Resilient means are provided for urging at least a portion of each of the at least one sidewalls into contact with spaced apart portions of the at least one rod to prevent relative movement between the at least a pair of locking arms and the at least one rod. The control means for releasing the locking means include at least one release rod. First mounting means are provided for mounting the at least one release rod on the at least one slidable member for movement therewith and for movement relative thereto. Force applying means are provided for applying a force to one of the at least a pair of locking arms to overcome the resilient means to permit relative movement between the one of the at least a pair of locking arms and the at least one rod in one direction or for applying a force on the other of the at least a pair of locking arms to overcome the resilient means to permit relative movement between the other of the at least a pair of locking arms and the at least one rod in the opposite direction. The force applying means include at least one elongated rod. Mounting means are provided for mounting the elongated rod on the at least one slidable member for movement relative thereto for applying the force to the one or the other of the at least a pair of locking arms. Movement of the at least one elongated rod in one direction applies a pulling force on the one of the at least a pair of locking means and movement of the at least one elongated rod in the opposite direction applies a pushing force on the other of the at least a pair of locking arms. The at least a pair of locking arms have inwardly facing surfaces and outwardly facing surfaces and the pulling or pushing force is applied to one or the other of the outwardly facing surfaces or the inwardly facing surfaces. Movement preventing means are provided for preventing movement of the one or the other of the at least a pair of locking arms in response to the resilient means or the force applying means. The movement preventing means include at least one additional elongated rod; additional mounting means for mounting the at least one additional elongated rod on the at least one slidable member for movement therewith and for movement between a first movement permitting location and a second movement permitting location and holding means for holding the at least one additional elongated rod at either of the first or the second movement permitting locations.

In another preferred embodiment of the invention, the control means compresses a hollow tube surrounding the brake rod and mounted for movement relative thereto. The lower end of the brake rod is secured to the relatively fixed support while the upper end is free. Included in this preferred embodiment is a modification in which the locking arm is a floating locking arm. In another modification, a locking arm having an arcuate section is mounted adjacent to another locking arm to provide locking means operating in each direction.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
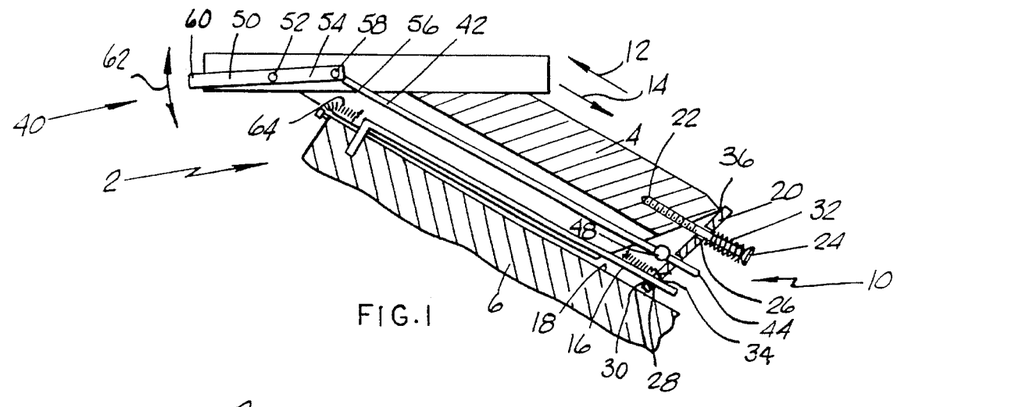
FIG. 1 is a side elevational view with parts in section of a portion of a preferred embodiment of the invention.
Figure 2:
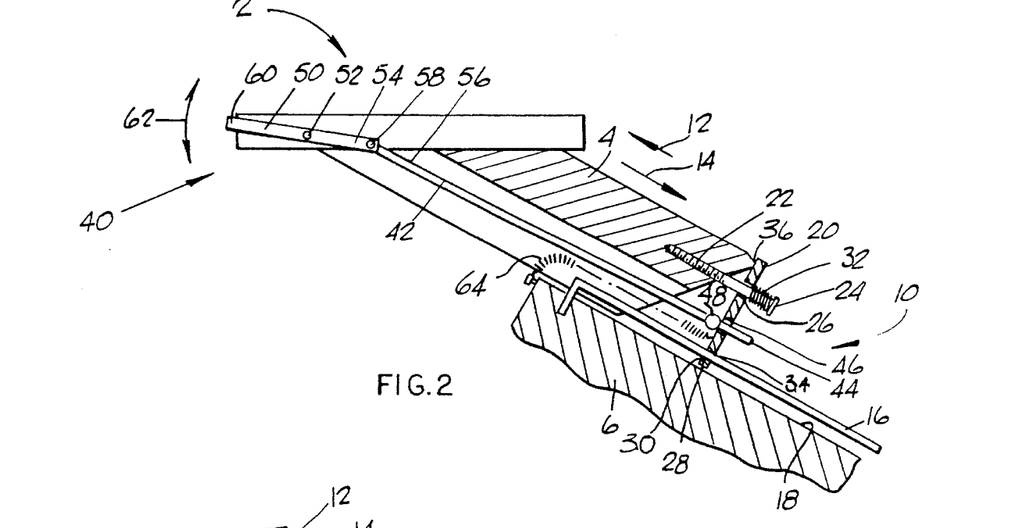
FIG. 2 is a side elevational view similar to FIG. 1 with the slidable member moved to a different location.

In FIGS. 1 and 2, there is illustrated apparatus 2 for permitting sliding movement of a slidable member 4 over a relatively fixed support 6. The at least one slidable member 4 and the relatively fixed support 6 can be of any desired cross-sectional configuration and can be used singly or in conjunction with other slidable members 4 and relatively fixed supports under varying circumstances. One such type of apparatus, capable of using apparatus of this invention, is illustrated in the above-identified Allard patent.

Releasable locking means 10 are provided for permitting movement of the at least one slidable member 4 in the direction indicated by the arrow 12 by the application of force to the at least one slidable member 4 but preventing movement of the at least one slidable member 4 in the direction indicated by the arrow 14. The releasable locking means 10 comprise at least one rod 16 mounted on the relatively fixed support 6 but spaced from an adjacent surface 18 thereof. At least one locking arm 20 is pivotally mounted on the slidable member 4 for movement therewith by a threaded screw 22 having an enlarged head portion 24 which threaded screw passes through an opening 26 in the locking arm 20. The opening 26 has a cross-sectional configuration larger than the threaded screw 22 to allow for the pivotal movement of the locking arm 20. The locking arm 20 has another opening 28 formed therein and the at least one rod 16 passes through the another opening 28. The another opening 28 has an internal sidewall 30 having a transverse cross-sectional configuration greater than the transverse cross-sectional configuration of the at least one rod 16 so that the at least one locking arm 20 may be moved to a location to permit the at least one locking arm 20 to be moved relative to the at least one rod 16 (as illustrated in FIG. 2). Resilient means 32, such as a coiled spring, are located between the head portion 24 and the opening 26 to urge the portion of the at least one locking arm 20 having the another opening 28 toward the at least one slidable member 4. As illustrated in the drawings, the pivotal axis of the locking arm 20 is the line contact 36 between the locking arm 20 and the slidable member 4. As a result of this, a portion 34 of the internal sidewall 30 moves into contact with a portion of the at least one rod 16 to prevent movement of the at least one slidable member 4 in the direction indicated by the arrow 14 (as illustrated in FIG. 1). If a force is applied to the at least one slidable member 4 in the direction indicated by the arrow 12, the force of the resilient means 32 will be overcome so that the at least one locking arm 20 will pivot to the location illustrated in FIG. 2 and permit the at least one locking arm 20 to slide over the at least one rod 16. The transverse cross-sectional configurations of the at least one rod 16 and the internal sidewall 30 can be of any shape but preferably are cylindrical.

Control means 40 are provided to release the at least one locking arm 20 from the locking position to permit movement of the at least one slidable member 4 in the direction indicated by the arrow 14. The control means comprise at least one release rod 42 having an end portion 44 passing through an opening 46 in the at least one locking arm 20. A fixed projection 48 on the at least one release rod 42 is located so that it can be moved into contact with the portions of the at least one locking arm 20 surrounding the opening 46 to apply a force to the at least one locking arm 20 to overcome the resilient means 32 and permit sliding movement of the at least one locking arm 20 over the at least one rod 16.

At least one lever arm 50 is pivotally mounted on the at least one slidable member 4 by pivot means 52. One end portion 54 is pivotally connected to the end portion 56 of the at least one release rod 42 by the pivot means 58. The other end portion 60 is located so that a force may be applied thereto so that the other end portion 60 can move in the directions indicated by the arrows 62. As illustrated in FIG. 1, the resilient means 32 will apply a force on the at least one locking arm 20 to move it against the fixed projection 48 to move the at least one lever arm 50 to the position illustrated in FIG. 1 so that movement of the at least one slidable member 4 in the direction indicated by the arrow 14 is prevented. When it is desired to move the at least one slidable member 4 in the direction indicated by the arrow 14, a force is applied to the other end portion 60 to move it from the location illustrated in FIG. 1 to the location illustrated in FIG. 2. The movement of the at least one lever arm 50 transmits a force against the at least one locking arm 20 to move it into the location illustrated in FIG. 2 so that the slidable member 4 can be moved in the direction indicated by the arrow 14. In FIGS. 1 and 2, the force applied to move the at least one locking arm to the unlocked location is a pushing force. A counterbalancing means 64, such as a coiled spring, is provided to overcome the weight of the at least one slidable member 4. As illustrated in FIG. 1, the coiled spring is connected at one end to the fixed support 6 and at the other end to the locking arm 20 so that, in addition to the counterbalancing function, it also adds an additional force to hold the locking arm 20 in the locked position.

Figure 3:
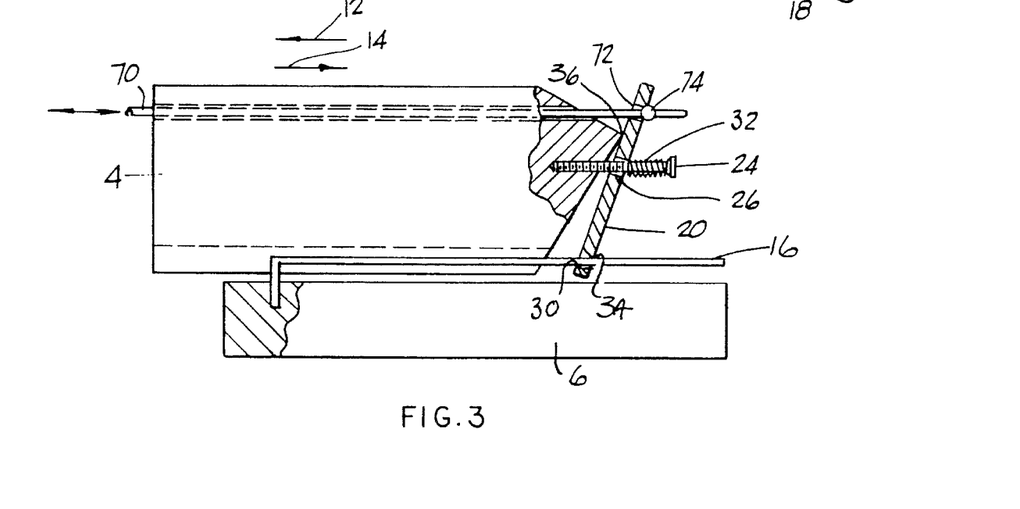
FIG. 3 is a side elevational view with parts in section of a portion of another preferred embodiment of the invention.

The apparatus illustrated in FIG. 3 is similar to that in FIGS. 1 and 2 and corresponding parts have been given the same reference numerals. In FIG. 3, the control means to release the at least one locking arm 20 from the locking position comprise a release rod 70 mounted for sliding movement through the at least one moveable member 4 and passing through an opening 72 in the at least one locking arm 10 and a fixed projection 74 is located to contact the portion of the at least one locking arm 20 surrounding the opening 72 to apply a force thereto to overcome the force of the resilient means 32. As illustrated in FIG. 3, the at least one slidable member 4 can move in the direction indicated by the arrow 12 but cannot move in the direction indicated by the arrow 14. When it is desired to move the at least one slidable member 4 in the direction indicated by the arrow 14, a force is applied to the release rod 70 to move it in the direction of the arrow 12 so that the fixed projection 74 pivots the at least one locking arm 20 to a location similar to that illustrated in FIG. 2 so that the at least one slidable member 4 can be moved in the direction indicated by the arrow 14. The fixed projection 74 applies a pulling force on the at least one locking arm 20 to pivot it.

Figure 4:
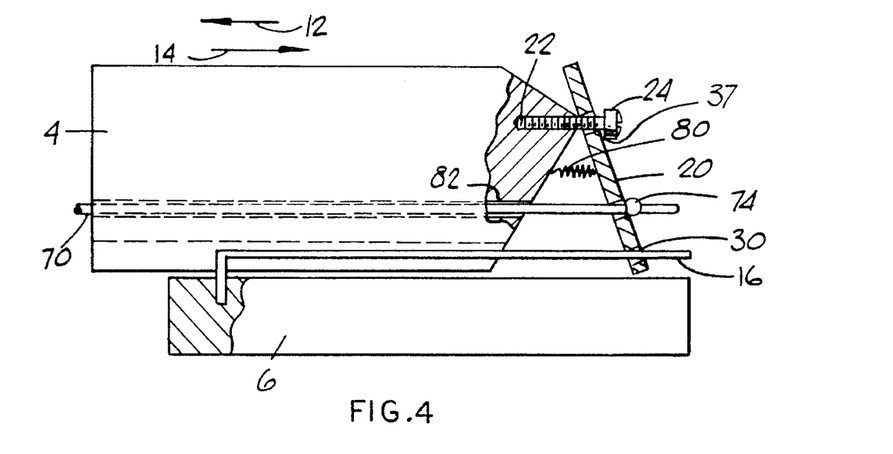
FIG. 4 is a side elevational view with parts in section of another preferred embodiment of the invention.
Figure 5:
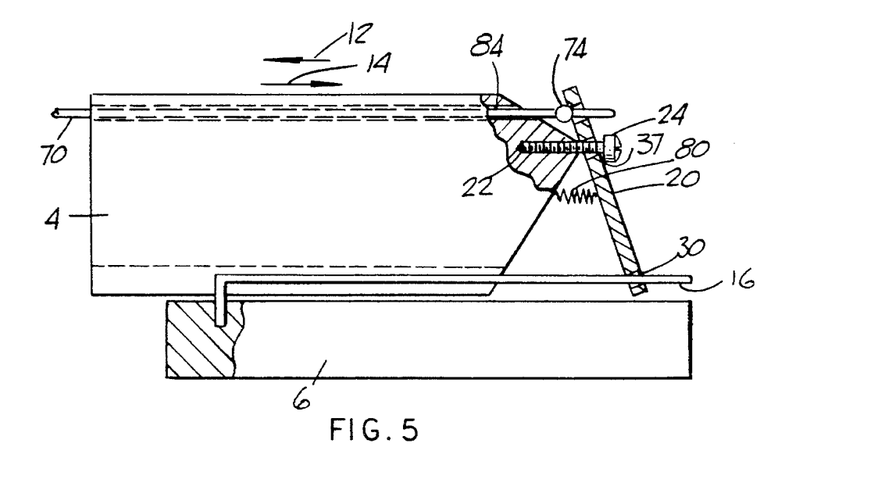
FIG. 5 is a side elevational view with parts in section of another preferred embodiment of the invention.

The apparatuses illustrated in FIGS. 4 and 5 are similar to that illustrated in FIGS. 1–3 and corresponding parts have been given the same reference numerals. The major difference in FIGS. 4 and 5 is that the resilient means 80 apply a force to urge the portion of the at least one locking arm 20 having the internal sidewall 30 in the direction away from the at least one slidable member 4 so that the pivotal axis of the locking arm 20 is the line contact 37 between the locking arm 20 and the screw head 24. In FIG. 4, to unlock the at least one slidable member 4, a force is applied to the release rod 70 to move it through a passageway 82 in the at least one slidable member 4 in the direction of the arrow 12 to apply a pulling force to pivot the at least one locking arm 20 to the unlocked position illustrated in FIG. 2. In FIG. 5, the fixed projection 74 is located so that when the release bar 70 is moved through a passageway 84 in the at least one slidable member 4 in the direction indicated by the arrow 14, it applies a pushing force on the at least one locking arm 20 to pivot it to the unlocked position illustrated in FIG. 2.

Figure 6:
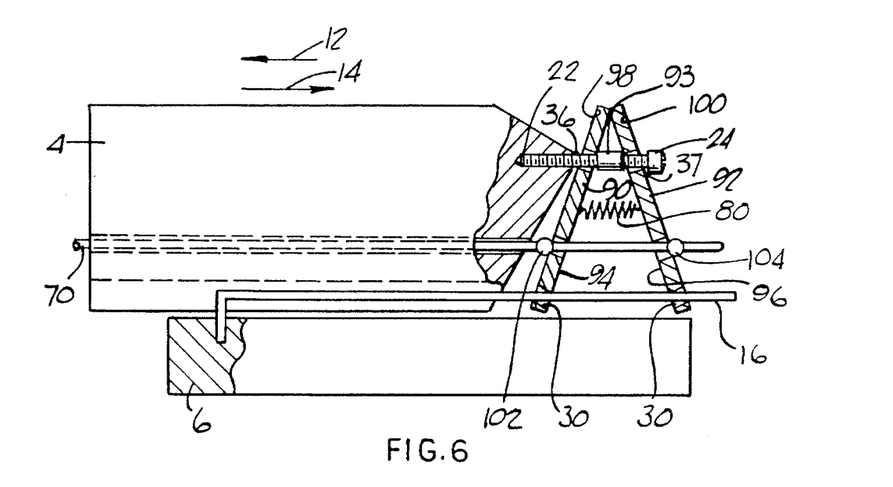
FIG. 6 is a side elevational view with parts in section of another preferred embodiment of the invention.
Figure 7:
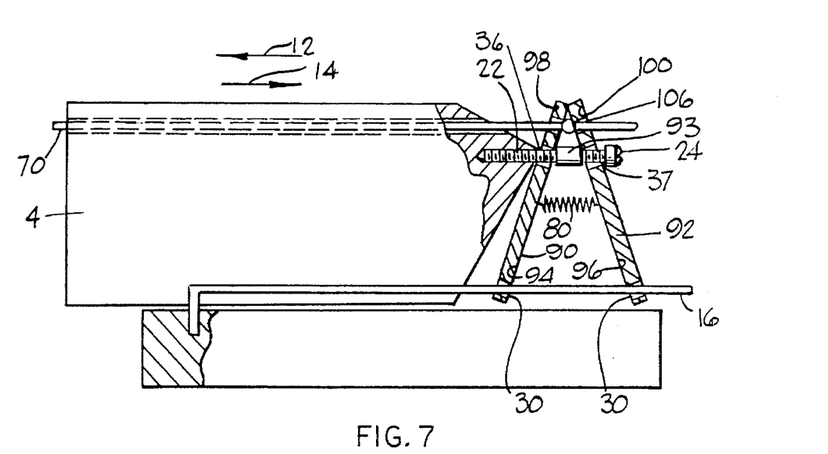
FIG. 7 is a side elevational view with parts in section of another preferred embodiment of the invention.

The apparatus illustrated in FIGS. 6 and 7 is generally similar to the apparatus illustrated in FIGS. 1–5 and corresponding parts have been given the same reference numerals. In FIGS. 6 and 7, there are at least a pair of locking arms 90 and 92 pivotally mounted on the threaded screw 22. The at least a pair of locking arms 90 and 92 have internal surfaces 94 and 96 and external surfaces 98 and 100. The resilient means 80 urge the at least a pair of locking arms 90 and 92 in directions away from each other so that movement of the at least one slidable member 4 in either of the directions indicated by the arrow 12 and 14 is prevented. Fixed projections 102 and 104 are located on the release rod 70 so that movement of the release rod 70 in the direction indicated by the arrow 14 results in a pushing force being exerted by the fixed projection 102 on the external surface 98 to pivot the locking arm 90 to the unlocked position and movement of the release rod 70 in the direction of the arrow 12 results in a pulling force being exerted by the fixed projection 104 on the external surface 100 to pivot the locking arm 92 to the locking position so that the at least one slidable member 4 can be selectively moved in one of two opposite directions. In FIG. 7, the fixed projection 106 is located between the internal surfaces 94 and 96, so that movement of the release rod 70 in the direction of the arrow 12 results in a pulling force being exerted by the fixed projection 106 on the internal surface 94 to pivot the locking arm 90 to the unlocked position and movement of the release rod 70 in the direction indicated by the arrow 14 results in a pushing force being applied by the fixed projection 106 on the internal surface 96 to pivot the locking arm 92 to the unlocked position so that the at least one slidable member 4 can be selectively moved in one of two opposite directions.

Figure 8:
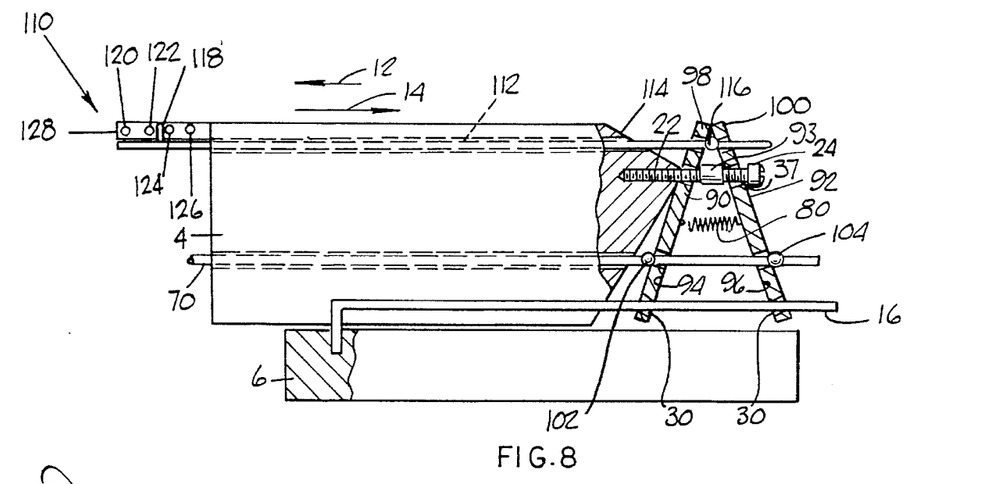
FIG. 8 is a side elevational view with parts in section of another preferred embodiment of the invention.
Figure 9:
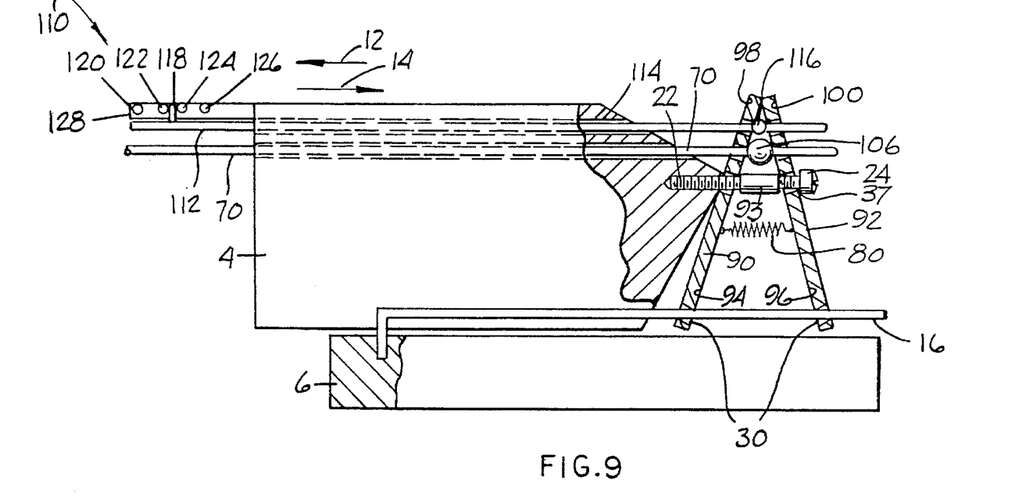
FIG. 9 is side elevational view with parts in section of another preferred embodiment of the invention.

The apparatus illustrated in FIGS. 8 and 9 is similar to the apparatus in FIGS. 6 and 7 and corresponding parts have been given the same reference numerals. In FIGS. 8 and 9, movement preventing means 110 have been added so that either of the at least a pair of locking arms may be moved and retained at the unlocked position or they can function as illustrated in FIGS. 6 and 7. The movement preventing means 110 comprise an elongated rod 112 which is mounted for sliding and rotational movement in a passageway 114 in the at least one slidable member 4. A fixed projection 116 is on the elongated rod 112 and is located between the internal surfaces 94 and 96. The elongated rod 112 has a projecting finger 118 and spaced apart fixed pins 120, 122, 124 and 126 are mounted on a support plate 128 secured to the at least one slidable member 4. In operation, when the finger 118 of the elongated rod 112 is located between pins 122 and 124, the apparatus functions the same as the apparatus in FIGS. 6 and 7. When the finger 118 is located between the pins 120 and 122, the fixed projection 116 has applied a pushing force on the internal surface 94 to pivot the locking arm 90 to the unlocked position. When the finger 118 is between the pins 124 and 126, the apparatus in FIGS. 4 and 5. The pins 120 and 122 will prevent sliding movement of the elongated rod 112 to hold the locking arm 90 in the unlocked position. If the elongated rod 112 is rotated to move the finger 118 from between the pins 120 and 122 and the elongated rod is moved in the direction of the arrow 14, the fixed projection 116 will apply a pushing force on the internal surface 96 to pivot the locking arm 90 to the unlocked position while the resilient means 80 returns the locking arm 90 to the locking position. When the finger 118 is between the pins 124 and 126, the apparatus functions the same as the apparatus in FIGS. 1–3. The elongated rod 112 is rotated to move the finger 118 between the pins 124 and 126 to prevent sliding movement thereof. The arrangement in FIGS. 8 and 9 provides many different ways of controlling the movement of the at least one slidable member 4.

Figure 10:
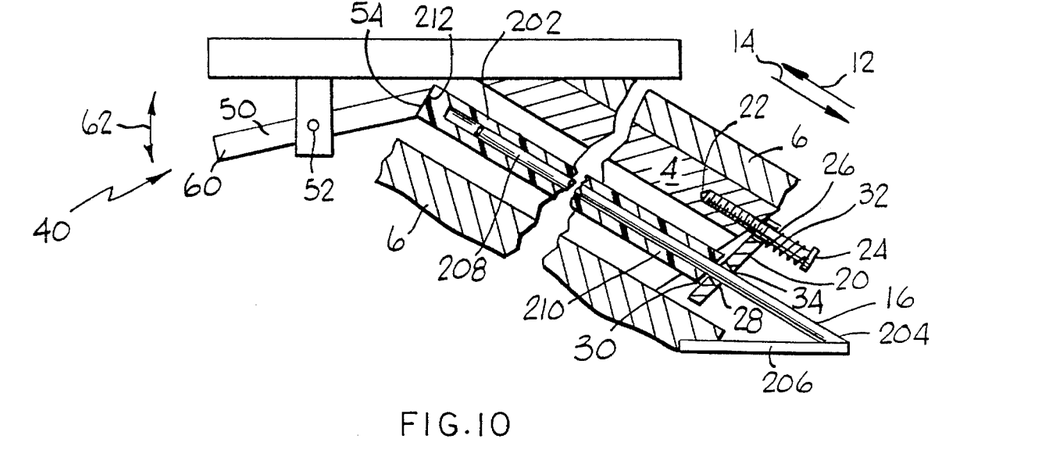
FIG. 10 is a side elevational view of another preferred embodiment of the invention.

The apparatus illustrated in FIG. 10 is similar in some aspects to the apparatus in FIGS. 1 and 2 and corresponding parts have been given the same reference numerals. In this embodiment of the invention, the control means 40 comprises a hollow tube 202 which surrounds the brake rod 16 and is dimensioned for sliding movement over the rod 16.

The hollow tube 202 can be of any transverse cross-sectional configuration and can be formed from metal or plastic. As illustrated in FIG. 10, one end 204 of the brake rod 16 is secured to a portion of a plate member 206 by suitable means such as by welding. The plate member 206 is secured to the fixed support 6. The other end 208 is free to move. One end 210 of the hollow tube 202 is adjacent to the locking arm 20 and the other end 212 is in contact with the one end portion 54 of the at least one lever arm 50. A portion of the rod 16 is in the opening 30 and the spring 32 urges the end portion 214 into line contact with the surface 216 of the slidable member 4 so that the locking arm 20 pivots about the line contact. In FIG. 10, the motion control apparatus 2 is in the locked position preventing movement of slidable member 4 in the direction indicated by the arrow 14 but permitting movement of the slidable member 4 in the direction indicated by the arrow 12. When it is desired to move the slidable member 4 in the direction indicated by the arrow 14, the lever arm 50 is actuated to move the hollow tube 202 against the locking arm 20 and to push against the locking arm 20 to move it so that the internal sidewall 30 of the opening 28 permits movement of the slidable member 4 over the brake rod 16.

Figure 11:
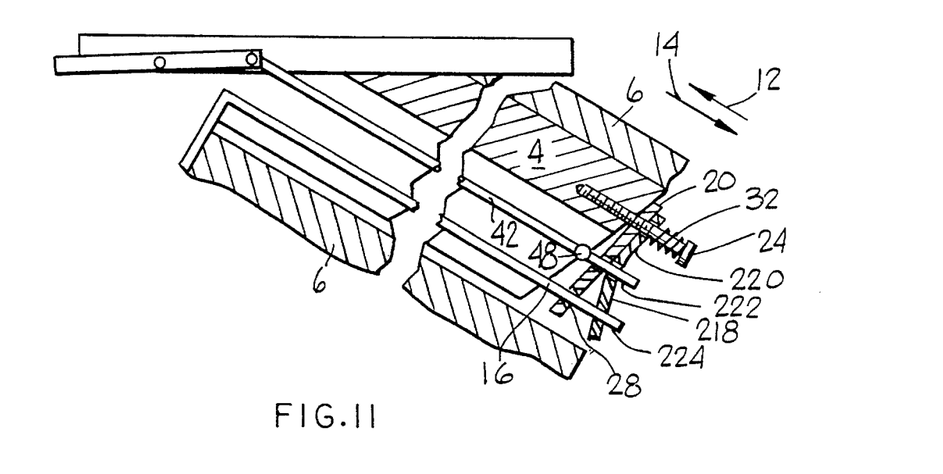
FIG. 11 is a side elevational view of another preferred embodiment of the invention in a locked position.
Figure 12:
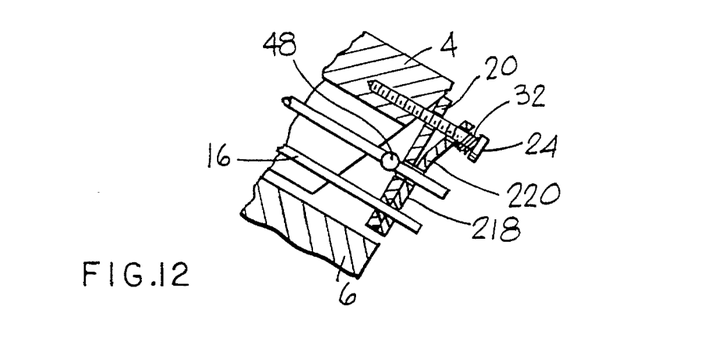
FIG. 12 is a side elevational view of a portion of FIG. 11 illustrating the invention in an unlocked position.

The apparatus illustrated in FIGS. 11 and 12 is similar in some aspects to the apparatus in FIGS. 1 and 2 and corresponding parts have been given the same reference numerals. A second locking arm 218 has an arcuate section 220, an opening 222 similar to the opening 26 and another opening 224 similar to the opening 28. As illustrated in FIG. 11, the locking arms 20 and 218 prevent movement of the slidable members in both of the directions illustrated by the arrow 12 and 14. When it is desired to move the slidable member 4, the lever 50 is actuated to move the control rod 42 so that the enlarged fixed projection 48 pivots the locking arm 20 which in turn pivots the second locking arm 218 to the position illustrated in FIG. 12.

Figure 13:
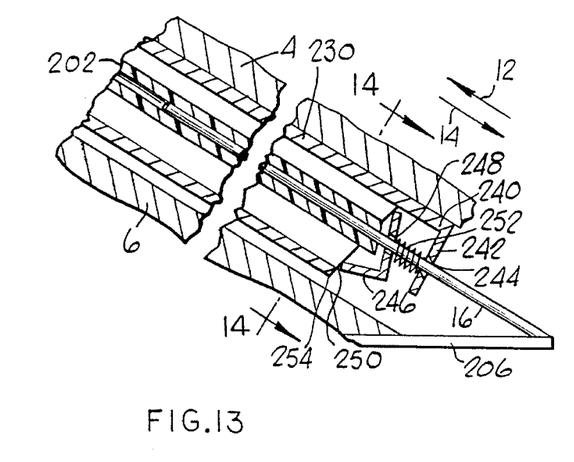
FIG. 13 is a side elevational view of another preferred embodiment of the invention.
Figure 14:
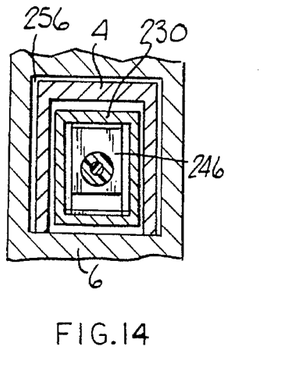
FIG. 14 is a cross-sectional view taken on the line 14—14 of FIG. 13.

Another preferred embodiment of the invention is illustrated in FIGS. 13 and 14 and has parts corresponding to parts in FIGS. 1, 2 and 10 and these corresponding parts have been given the same reference numerals. A hollow tube 230 is mounted at a fixed location by suitable means (not shown) on the slidable member 4 and has a generally rectangular transverse cross-sectional configuration but can have other transverse cross-sectional configurations and can be formed from metal or plastic. A portion 240 of the hollow tube 230 projects outwardly and has a depending flange portion 242 having an opening 244 through which the brake rod 16 passes. The opening 244 has a cross-sectional configuration slightly larger than the cross-sectional configuration of the brake rod 16 to permit sliding movement of the flange portion 242 over the brake rod 16. A right-angled locking arm 246 has an opening 248 similar to the opening 28 and through which the brake rod 16 passes. The right angled locking arm 246 has an end portion 250 which, when in the locking position illustrated in FIG. 13, bears against the end surface 254 of the hollow tube 230. Although the locking arm 246 is illustrated as being a right angle, it is understood that it can have other angular relationships as long as it is such that the end portion 250 bears against the end surface 254 of the hollow tube. If desired, the brake rod 16 and the opening 248 can have transverse cross-sectional configurations to prevent relative rotational movement therebetween. A coiled spring 252 surrounds a portion of the brake rod 16 and is located between the flange 242 and the opening 248 and applies pressure on the right-angled locking arm 246 to hold the end portion 250 in contact with the end surface 254 of the hollow tube 230. When in the locking position illustrated in FIG. 13, the right-angled locking arm 246 permits movement of the slidable member 4 in the direction indicated by the arrow 12 but prevents movement of the slidable member 4 in the direction indicated by the arrow 14. When it is desired to move the slidable member 4 in the direction of the arrow 14, the lever arm 50 is actuated to move the tube 202 to apply a force on the right-angled locking arm 246 to pivot it to a position permitting movement of the movable member 4 in the direction indicated by the arrow 14. During the movement of the locking arm 246, the end portion 250 will move over the end surface 254. Although the hollow tube 230 is preferred, an angled bracket having an opening 244 therein could be secured by suitable means on the slidable member 4 and a stop member could be secured on the slidable member 4 to serve as a stop for the end portion 248.

As illustrated in FIG. 14, the slidable member 4 has a U-shaped configuration but it could be a four-sided configuration and is mounted for sliding movement in a passageway 256 in the support 6.

Figure 15:
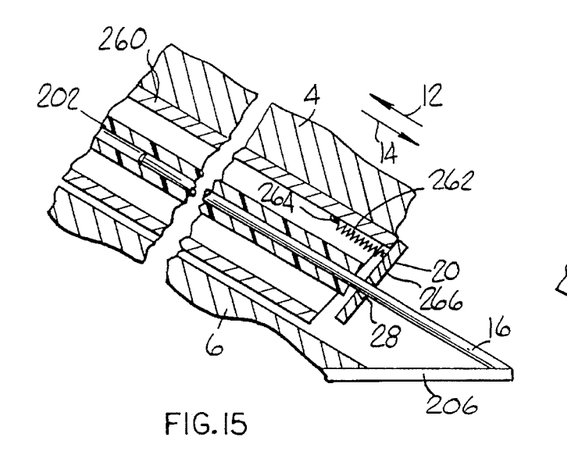
FIG. 15 is a side elevational view of another preferred embodiment of the invention.

Another preferred embodiment of the invention is illustrated in FIG. 15 and has parts corresponding to parts in FIGS. 1, 2, 10 and 13 and the corresponding parts have been given the same reference numerals. A hollow tube 260 is mounted at a fixed location by suitable means (not shown) on the slidable member 4. It is understood that the hollow tube 260 can be of any cross-sectional configuration and can be metal or plastic. A locking arm 20 has the opening 28 through which the brake rod 16 passes. A coiled spring 262 has one end 264 secured to the hollow tube 260 and the other end 266 secured to the locking arm 20 to pull the locking arm 20 into the locking position illustrated in FIG. 15 to permit movement of the slidable member 4 in the direction of the arrow 12 but to prevent movement of the slidable member 4 in the direction of the arrow 14. When it is desired to move the slidable member in the direction of the arrow 14, the lever arm 50 is actuated to move the hollow tube 202 against the locking arm 20 to pivot it to a position permitting movement of the locking arm 20 over the rod 16. Although the hollow tube 260 is preferred, the one end 264 could be secured to a portion of the slidable member 4 by any suitable means so long as it applies a force on the locking arm 20 to hold it in a locking position and a stop member could be secured to the slidable member 4 to serve as an abutment surface for the end of the lever 20.

Figure 16:
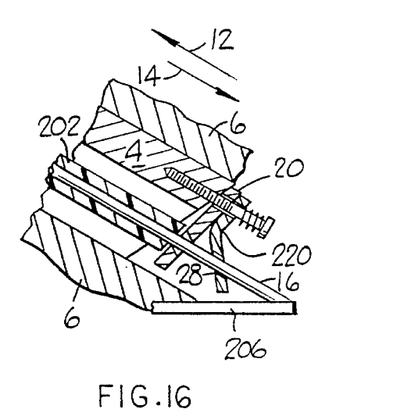
FIG. 16 is a side elevational view of another preferred embodiment of the invention.

In FIG. 16, there is illustrated another preferred embodiment of the invention and adds to FIG. 10, the second locking arm 220 of FIG. 11.

Another embodiment of the invention is illustrated in

Figure 17:
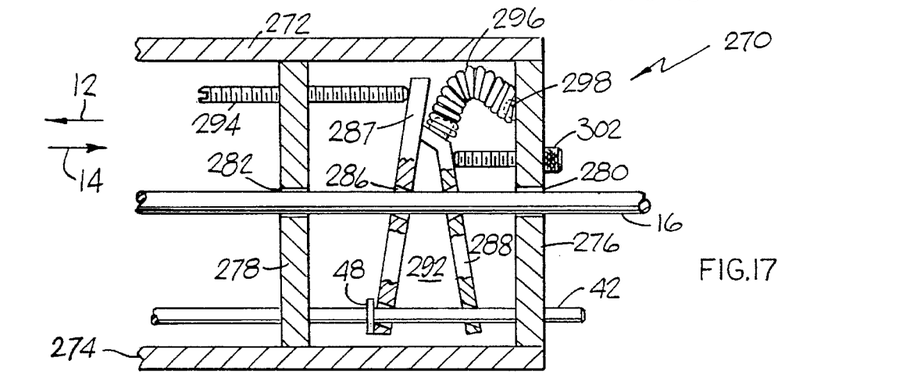
FIG. 17 is a side elevational view of another preferred embodiment of the invention.

FIG. 17 and has parts corresponding to parts in FIGS. 1, 2 and 10 and these corresponding parts have been given the same reference numerals. A slidable member 270 is mounted for controlled sliding movement over the brake rod 16. The slidable member 270 could be mounted on slidable member 4 for movement therewith through passageway 256 or can be mounted for sliding movement through any passageway. The slidable member 270 has longitudinally extending portions 272 and 274 and transversely extending portions 276 and 278 connected to the longitudinally extending portions 272 and 274. The brake rod 16 passes through holes 280 and 282 so that the slidable member 270 may move over the brake rod 16. A first locking arm 284 has an opening 286 similar to the opening 28, surrounding the brake rod 16 and when in the position illustrated in FIG. 17 prevents movement of the slidable member 270 in the direction indicated by the arrow 14 but permits movement in the direction indicated by the arrow 12. A second locking arm 288 has an opening 290, similar to the opening 28, surrounding the brake rod 16 and when in the position illustrated in FIG. 17 prevents movement of the slidable member 270 in the direction indicated by the arrow 14. A cover plate 292 is secured to one side of the portions 272, 274, 276 and 278 and another cover plate (not shown) is secured to the other side of the portions 272, 274, 276 and 278 to form a cavity therebetween. A threaded bolt 294 is in threaded engagement with a threaded opening (not shown) in the portion 278 and is moved inwardly to a position where it contacts a portion of the first locking arm 284 to provide for the pivotal movement of the first locking arm 284. A coiled spring 296 has one end 298 in contact with the portion 278 and the other end 300 in contact with a portion of the second locking arm 288 to apply a force to the first and second locking arms 284 and 288 to urge them into the locking positions illustrated in FIG. 17 to prevent movement of the slidable member 270 in either of the directions indicated by the arrows 12 and 14. When it is desired to move the slidable member 270, the release rod 42 is moved in the direction of the arrow 14 and the projection 48 applies a force to pivot the first and second locking arms 284 and 288 into the unlocked position to permit movement of the slidable member 270. The threaded bolt 302 is in threaded engagement with a threaded opening (not shown) in the portion 276 and is moved inwardly into contact with a portion of the second locking arm 288 to assist in the pivotal movement thereof. As illustrated in FIG. 17, the brake rod 16 is located between the pivotal axes of the first and second locking arms 284 and 288 and the release rod 42. If desired, a hollow tube 202 over surrounding the brake rod 16 could be used to apply the force on the first locking arm 284.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. Motion control apparatus comprising:

at least one relatively fixed support;

at least one slidable member mounted for sliding movement over said at least one relatively fixed support;

releasable locking means for preventing said movement of said at least one slidable member in at least one direction;

control means for releasing said releasable locking means to permit said sliding movement of said at least one slidable member;

wherein said releasable locking means comprise:
   at least one rod mounted on said at least one relatively fixed support;
   at least one locking arm mounted on said at least one slidable member for movement therewith and having at least one opening formed therein;
   said at least one opening having at least one sidewall;
   pivot means for permitting pivotal movement of said at least one locking arm around a pivotal axis;
   said at least one opening having a transverse cross-sectional configuration larger than the transverse cross-sectional configuration of said at least one rod;
   at least a portion of said at least one rod being located in said at least one opening;
   resilient means for urging at least a portion of said at least one sidewall into contact with at least a portion of said at least one rod to prevent relative movement between said at least one locking arm and said at least one rod in said at least one direction; and
   said control means comprising a hollow tube mounted for sliding movement over said at least one rod to apply a force on said at least one locking arm to move said portion of said at least one sidewall out of contact with said at least a portion of said at least one rod to permit movement of said at least one locking arm over said at least one rod in said at least one direction.

2. Motion control apparatus comprising:

at least one support;

at least one slidable member mounted for sliding movement over said at least one support;

releasable locking means for preventing said sliding movement of said at least one slidable member;

control means for releasing said locking means to permit said sliding movement of said at least one slidable member;

wherein said releasable locking means comprise:
   at least one rod having one end portion mounted on said at least one support at a fixed location;
   said at least one rod having another end portion that is free to move relative to said at least one support;
   at least one locking arm mounted on said at least one slidable member for movement therewith and having at least one opening formed therein;
   said at least one opening having at least one sidewall;
   pivot means for permitting pivotal movement of said locking arm around a pivotal axis;
   said at least one opening having a transverse cross-sectional area greater than the transverse cross-sectional area of said at least one rod;
   at least a portion of said at least one rod being located in said at least one opening;
   resilient means for urging at least a portion of said at least one sidewall into contact with at least a portion of said at least one rod to prevent relative movement between said at least one locking arm and said at least one rod in said at least one direction; and
   said control means applying a force on said at least one locking arm to move said at least one sidewall out of contact with said at least a portion of said at least one rod.

3. Apparatus as in claim 2 and further comprising:

at least a second locking arm on said slidable member for movement therewith and having at least another opening formed therein;

said at least another opening having at least one sidewall;

additional pivot means for permitting pivotal movement of said at least a second locking arm around a second pivotal axis;

said at least another opening having a transverse cross-sectional configuration larger than the transverse cross-sectional configuration of said at least one rod;

at least another portion of said rod being located in said at least another opening;

said resilient means urging at least a portion of said at least one sidewall of said at least another opening into contact with said at least another portion of said at least one rod to prevent relative movement between said at least a second locking arm and said at least one rod in a direction opposite to said at least one direction;

said at least one locking arm applying a force on said at least a second locking arm in response to said force applied by said hollow tube to move said at least a portion of said at least another opening out of contact with said at least another portion of said at least one rod to permit movement of said at least a second locking arm in said direction opposite to said at least one direction; and said control means comprising a hollow tube mounted for sliding movement over said at least one rod to apply a force on said at least one locking arm to move said portion of said at least one sidewall out of contact with said at least a portion of said at least one rod to permit movement of said at least one locking arm over said at least one rod in said at least one direction.

4. Apparatus as in claim 3 wherein:

said at least a second locking arm being located between said resilient means and said at least one locking arm.

5. Apparatus as in claim 4 wherein:

said at least one locking arm having at least one flat surface portion;

said at least a second locking arm having at least one arcuate surface portion; and said at least one flat surface portion and said at least one arcuate sur#ace portion being in a facing relationship.

6. Apparatus as in claim 2 wherein:

said at least one locking arm comprises a base portion and a leg portion extending from said base portion at an angle less than one hundred and eighty degrees;

said base portion having said at least one opening formed therein;

an abutment surface mounted at a fixed location on said at least one slidable member;

said leg portion being in contact with said abutment surface to provide for said pivotal movement of said at least one locking arm; and said control means comprising a hollow tube mounted for sliding movement over said at least one rod to apply a force on said at least one locking arm to move said portion of said at least one sidewall out of contact with said at least a portion of said at least one rod to permit movement of said at least one locking arm over said at least one rod in said at least one direction.

7. Apparatus as in claim 6 wherein said resilient means comprise:

a coiled spring surrounding a portion of said at least one rod;

a second abutment surface mounted at another fixed location on said at least one slidable member; and said coiled spring having one end portion in contact with said second abutment surface and another end portion in contact with said base portion to apply a pushing force on said base portion.

8. Apparatus as in claim 6 wherein:

said transverse cross-sectional configuration of said at least one opening and said transverse cross-sectional configuration of said at least one rod preventing relative rotational movement therebetween.

9. Apparatus as in claim 2 wherein:

said at least one locking arm comprising a plate member having a central body portion, one end portion having said at least one opening formed therein and an abutment surface on the other end portion;

another abutment surface mounted at a fixed location on said at least one slidable member;

said resilient means urging said abutment surface into contact with said another abutment surface to move said at least one locking arm into position to prevent said relative movement between said at least one locking arm and said at least one rod in said at least one direction; and said control means comprising a hollow tube mounted for sliding movement over said at least one rod to apply a force on said at least one locking arm to move said portion of said at least one sidewall out of contact with said at least a portion of said at least one rod to permit movement of said at least one locking arm over said at least one rod in said at least one direction.

10. Apparatus as in claim 9 wherein said resilient means comprises:

spring means having one end portion secured at a fixed location on said at least one slidable member and the other end portion secured to said plate member at a location between said at least one opening and said abutment surface to exert a pulling force on said at least one locking arm.

11. Apparatus as in claim 2 and further comprising:

at least a second locking arm mounted on said slidable member for movement therewith and having at least another opening formed therein;

said at least another opening having at least one sidewall;

additional pivot means permitting pivotal movement of said at least a second locking arm around a second pivotal axis;

said at least another opening having a transverse cross-sectional configuration larger than the transverse cross-sectional configuration of said at least one rod;

at least another portion of said rod being located in said at least another opening;

said resilient means urging at least a portion of said at least one sidewall of said at least another opening into contact with said at least another portion of said at least one rod to prevent relative movement between said at least a second locking arm and said at least one rod in a direction opposite to said at least one direction;

said at least one locking arm applying a force on said at least a second locking arm in response to said force applied by said control means to move said at least a portion of said at least another opening out of contact with said at least another portion of said at least one rod to permit movement of said at least a second locking arm in said direction opposite to said at least one direction.

12. Apparatus as in claim 11 wherein:

said at least a second locking arm being located between said resilient means and said at least one locking arm.

13. Apparatus as in claim 12 wherein:

said at least one locking arm having at least one flat surface portion;

said at least a second locking arm having at least one arcuate surface portion; and said at least one flat surface portion and said at least one arcuate surface portion being in a facing relationship.

14. Apparatus as in claim 2 wherein:

said control means being located between said pivotal axis and said at least one opening.

15. Apparatus as in claim 2 wherein:

said at least one locking arm comprising a plate member having a central body portion and opposite end portions;
said at least one opening being located in one of said opposite end portions;
at least another opening in the other of said opposite end portions; and
at least a portion of said control means being located in said at least another opening.

16. Apparatus as in claim 2 wherein said releasable locking means comprises:
at least one rod mounted at a fixed location on said at least one support;
at least a pair of locking arms pivotally mounted on said at least one slidable member;
each of said at least a pair of locking arms having at least one opening formed therein;
said at least one opening having at least one sidewall;
said at least one opening having a transverse cross-sectional configuration greater than the transverse cross-sectional configuration of said at least one rod;
at least a portion of said at least one rod being located in each of said at least one openings;
resilient means for urging at least a portion of each of said at least one sidewalls into contact with spaced apart portions of said at least one rod so that said at least one sidewall in one of said at least a pair of locking arms functions to permit movement in one direction and to prevent movement in the opposite direction and said at least one sidewall is the other of said at least a pair of locking arms functions to permit movement in said opposite direction and to prevent movement in said one direction;
and wherein said control means comprise:
at least one release rod;
first mounting means for mounting said at least one release rod on said at least one slidable member for movement therewith and for movement relative thereto; and
force applying means for applying a force to one of said at least a pair of locking arms to overcome said resilient means to permit relative movement between said one of said at least a pair of locking arms and said at least one rod in said opposite direction or for applying a force on the other of said at least a pair of locking arms to overcome said resilient means to permit relative movement between said other of said at least a pair of locking arms and said at least one rod in said opposite direction.

17. Apparatus as in claim 16 and further comprising:
movement preventing means for preventing movement of at least one of said at least a pair of locking arms into said locking position.

18. Apparatus as in claim 2 wherein:
said at least one rod being located between said pivotal axis and said control means.

19. Apparatus as in claim 18 and further comprising:
at least a second locking arm mounted on said slidable member for movement therewith and having at least another opening formed therein;
said at least another opening having at least one sidewall;
additional pivot means permitting pivotal movement of said at least a second locking arm around a second pivotal axis;
said at least another opening having a transverse cross-sectional configuration larger than the transverse cross-sectional configuration of said at least one rod;
at least another portion of said rod being located in said at least another opening;
said resilient means urging at least a portion of said at least one sidewall of said at least another opening into contact with said at least another portion of said at least one rod to prevent relative movement between said at least a second locking arm and said at least one rod in a direction opposite to said at least one direction;
said at least one locking arm applying a force on said at least a second locking arm in response to said force applied by said control means to move said at least a portion of said at least another opening out of contact with said at least another portion of said at least one rod to permit movement of said at least a second locking arm in said direction opposite to said at least one direction.

20. Apparatus as in claim 19 wherein said slidable member comprises:
at least a pair of longitudinally extending portions;
at least a pair of transversely extending portions connected to said longitudinally extending portions to form an opening therebetween; and
said first and second locking arms being located in said opening.

* * * * *